United States Patent [19]
Roskott et al.

[11] 3,819,496
[45] June 25, 1974

[54] STABILIZER SYSTEMS FOR LIGHT-CURABLE POLYESTERS

[75] Inventors: Lodewijk Roskott, Deventer; Arnoldus Adrianus Maria Groenendaal, Vorden, both of Netherlands

[73] Assignee: Akzo N.V., Arnhem, Netherlands

[22] Filed: Jan. 31, 1973

[21] Appl. No.: 328,440

[30] Foreign Application Priority Data
Feb. 21, 1972  Netherlands.................. 7202217

[52] U.S. Cl... 204/159.19, 204/159.15, 204/159.23, 260/28, 260/28.5 R, 260/41 A, 260/41 B, 260/45.75 R, 260/45.8 N, 260/45.9, 260/861, 260/863, 260/864
[51] Int. Cl............................. B01j 1/10, B01j 1/12
[58] Field of Search...260/45.95 C, 45.9, 45.75 R; 204/159.19, 159.15

[56] References Cited
UNITED STATES PATENTS
3,188,363  6/1965  Amidon et al. ............. 260/45.75 C
3,627,657  12/1971  Nistri et al. .................... 204/159.15

*Primary Examiner*—Murray Tillman
*Assistant Examiner*—Richard B. Turer
*Attorney, Agent, or Firm*—Stevens, Davis, Miller & Mosher

[57] ABSTRACT

A stabilized, U.V. light curable composition comprising a mixture which contains an unsaturated polyester resin, a benzoin ether of a primary or secondary alcohol and, as a stabilizer for the composition, an iron and/or manganese compound soluble in the polyester resin and at least one organic compound having ionically-bound chlorine or capable of forming chlorine ions in situ.

14 Claims, No Drawings

STABILIZER SYSTEMS FOR LIGHT-CURABLE POLYESTERS

The present invention relates to a process for preparing a stabilized composition which is curable by U.V. light and which contains unsaturated polyester resin, to the composition per se, and to the curing of this composition. After curing the composition by U.V. light, a polyester resin is obtained suitable for e.g., surface-coating.

The expression "unsaturated polyester resin" as used herein means a mixture of an unsaturated polyester and one or more polymerizable ethylenically unsaturated monomers, such as styrene, vinyl toluene, methylmethacrylate, diallyl phthalate, divinyl benzene, p-tert.butylstyrene and vinyl acetate as found in U.S. Pat. No. 3,367,994.

The weight ratio of monomer to unsaturated polyester generally ranges from 30–50 parts of monomer to 70–50 parts of unsaturated polyester.

The unsaturated polyester may be obtained by reacting a polyhydric alcohol, such as ethylene glycol, propylene glycol, or diethylene glycol, with an unsaturated dibasic carboxylic acid, such as maleic acid, fumaric acid or itaconic acid, if desired in the presence of a saturated acid, such as malonic acid, adipic acid, sebacic acid or tartaric acid, and also phthalic acid, isophthalic acid or tetrachlorophthalic acid.

In order to prevent the unsaturated polyester resin from undergoing premature gelation, a stabilizer is preferably added to the polyester in a quantity of 0.005 percent – 0.15 percent by weight, preferably 0.01 percent by weight calculated on the unsaturated polyester. The stabilizers hitherto most used are hydroquinone and p-tert.butyl-catechol.

Unsaturated polyester resins may be cured with the aid of U.V. light. For rapid curing, photo-initiators are incorporated in the unsaturated polyester resin in an amount of 0.1 – 5 percent, preferably 1 – 2 percent by weight calculated on the polyester resin. The photo-initiators most used in practice are benzoin ethers of primary and secondary alcohols, such as methyl alcohol, ethyl alcohol, propyl alcohol, n-butyl alcohol, isobutyl alcohol, 2-ethylhexyl alcohol, propanol-2, butanol-2, pentanol-2 and pentanol-3.

However, unsaturated polyester resins containing as photo-initiators the before-mentioned benzoin ethers, especially those of primary alcohols, have the disadvantage that they gel prematurely on storage in the dark.

It is known that the storage stability of unsaturated polyester resins may be enhanced by incorporating therein quaternary ammonium salts, such as trimethylbenzyl ammonium chloride, trimethylbenzyl ammonium acetate, trimethylphenyl ammonium chloride, trimethylphenyl ammonium phosphate and trimethylphenyl ammonium acetate, in quantities ranging from 0.1 to 0.5 percent by weight calculated on the resin.

However, these compounds, when added to polyester resins which contain benzoin ethers as photo-initiators, do not improve the stability or improve the stability only to a small extent.

Surprisingly, it has now been found that the stability of unsaturated polyester resins containing benzoin ethers as photo-initiators may be considerably improved on storage in the dark by incorporating in them an iron and/or manganese compound which is soluble in the resin and at least one organic chlorine compound which either contains ionically-bound chlorine or is capable of forming chlorine ions in situ.

Organic chlorine compounds capable of forming chlorine ions in polyester resins are those compounds which cause a precipitate of silver chloride, when 0.1 – 1.0 g of the compound is dissolved in about 10 ml of a mixture of water and acetone, in a ratio of 4:1 to 1:1, followed by the addition of about 0.5 ml of 4N nitric acid and a few drops of 0.1N silver nitrate.

Examples of such compounds are compounds having the general formula:

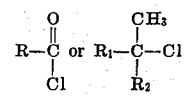

wherein R represents an alkyl group, $C_5$–$C_{20}$, or a substituted or non-substituted aryl group, of $C_6$–$C_{12}$, $R_1$ represents a substituted or non-substituted aryl group, $C_6$–$C_{12}$, and $R_2$ represents a hydrogen atom or an alkyl group, $C_1$–$C_4$, such as lauroyl chloride, 2-ethylhexanoyl chloride, ortho-methylbenzoyl chloride, benzoyl chloride and cumyl chloride.

Quaternary ammonium chlorides, such as $C_{12}$–$C_{18}$-alkyl-dimethylbenzyl ammonium chloride, $C_{12-18}$-alkyldimethylethylbenzyl ammonium chloride, phenyltrimethyl ammonium chloride, stearyldimethylbenzyl ammonium chloride, $C_{12-18}$-alkylmethylisoquinolinium chloride, $C_{12-18}$—dialkyldimethyl ammonium chloride, dimethyl-amine.HCl, benzylamine.HCl and triethylamine.HCl may be mentioned as examples of organic compounds which contain ionically-bound chlorine.

The iron and manganese should desirably be incorporated in the polyester resin in the form of a compound which is soluble in the resin. The preferred compounds are soluble manganese or iron salts, such as chlorides, naphthenates, octoates or acetylacetonates.

Dependent upon the nature of the polyester resin and the benzoin ether used, iron and/or manganese compounds are incorporated in the polyester resin in such quantities that the polyester resin contains 0.00002 percent – 0.001 percent by weight if iron and/or manganese, preferably 0.0002 percent – 0.0004 percent by weight, and 0.001 percent – 0.1 percent by weight of organic chlorine compound.

Incorporation may take place in the usual way by dissolving the selected compounds in the unsaturated polyester resin with or without the aid of a solvent. n-Butanol, dimethyl phthalate, diethyl phthalate, dibutyl phthalate, dioctyl phthalate, dimethyl formamide, toluene or xylene may be used as a solvent.

However, it is also possible to add the iron and/or manganese salt and the organic chlorine compound to the benzoin ether. In this case, it is advantageous that these compounds are soluble in the benzoin ether. If desired, filters, such as calcium carbonate, calcium magnesium carbonate, magnesium silicate, aluminum silicate, silicon oxide, barium sulphate and calcium sulphate may be added to the polyester resin in an amount of 5 – 500 percent, preferably 25 – 250 percent by weight calculated on the polyester resin so as to formulate it for use as a putty.

In order to prevent air-inhibition, 0.1 percent by weight of a solid paraffin having a melting point of 52°

−54°C. may be added to resins which do not contain fillers.

The composition according to the present invention may be cured in the usual way. To this end, the composition according to the present invention was spread by means of a film drawing knife on a glass plate in layers having a thickness of 300 μ. Subsequently, these layers were irradiated for 120 sec. with a U.V. light source placed 20 cm above the resin sheets. The light source had a light emission mainly in the range from 300 to 400 n.m. The curing was determined with an oscillation hardness measuring apparatus according to Persoz. The curing of putties was determined with the aid of the residual styrene-content of the resin cured according to the method described in "Kunststoffe", 53 (10) 801–804 (1963). The storage stability of the unsaturated resin was determined in the dark at a temperature of 100°C.

The following examples illustrate the invention. Where in these examples reference is made to an unsaturated polyester resin, this refers to an all-purpose composition obtained by condensing 1 mol of maleic acid anhydride and 1 mol of phthalic acid anhydride with 1.1 mol of ethylene glycol and 1.1 to 1.2 mol of propane-diol-1,2. The esterification took place at a temperature of 200°C. while stirring and under a current of nitrogen. After the addition of 0.01 part by weight of hydroquinone to 100 parts by weight of condensate, the latter was mixed with styrene in a ratio of 65 : 35. The unsaturated polyester resin thus obtained had an acid number of about 50.

EXAMPLE I

A solution of iron chloride in trialkylbenzyl ammonium chloride containing 0.0004 parts by weight of iron and 0.05 parts by weight of trialkylbenzyl ammonium chloride, calculated on the resin, was dissolved in 100 parts by weight of the unsaturated polyester resin hereinbefore described. The organic chloride contained 40 percent by weight of dodecyldimethylbenzyl ammonium chloride, 50 percent by weight of tetradecyldimethylbenzyl ammonium chloride and 10 percent by weight of hexadecyldimethyl ammonium chloride. Subsequently, 2 parts by weight of n-butylether of benzoin were dissolved in the resin. The stability in the dark at 100°C. and the hardness according to Persoz after lighting for 2 minutes of the composition thus obtained were determined. Comparable tests were made with a polyester resin in which solely the n-butylether of benzoin had been dissolved, and with a polyester resin in which the same ether together with iron chloride or together with the trialkylbenzyl ammonium chloride hereinbefore described had been dissolved. The compositions used and the results obtained are tabulated hereafter (Table 1).

EXAMPLE II

In the same way as described in Example I, 0.0004 parts by weight of manganese added in the form of manganese naphthenate, 0.05 parts by weight of trialkylbenzyl ammonium chloride having the composition described in Example I and 2 parts by weight of n-butylether of benzoin were dissolved in 100 parts by weight of the unsaturated polyester resin hereinbefore described. The stability in the dark at 100°C. and the hardness according to Persoz after lighting for 2 minutes of the composition thus obtained were determined.

Table 1

| 2% of Benzoin ether | 0.0004% of iron as | % | chloro compound | stability in minutes | Persoz hardness |
|---|---|---|---|---|---|
| n-butyl | — | — | — | 33 | 260 |
| n-butyl | chloride | — | — | 36 | 250 |
| n-butyl | — | 0.05 | trialkylbenzyl ammonium chloride | 55 | 266 |
| n-butyl | chloride | 0.05 | trialkylbenzyl ammonium chloride | 300 | 268 |
| n-butyl | — | 0.013 | ethylene diamine·HCl | 35 | 277 |
| n-butyl | naphthenate | 0.013 | ethylene diamine·HCl | 110 | 278 |
| n-butyl | — | 0.02 | cumyl chloride | 32 | 274 |
| n-butyl | chloride | 0.02 | cumyl chloride | 290 | 276 |
| ethyl | — | — | — | 32 | 284 |
| ethyl | naphthenate | — | — | 40 | 279 |
| ethyl | — | 0.01 | dimethyl amine·HCl | 29 | 289 |
| ethyl | naphthenate | 0.01 | dimethyl amine·HCl | 320 | 291 |
| n-propyl | — | — | — | 30 | 276 |
| n-propyl | chloride | — | — | 45 | 270 |
| n-propyl | — | 0.02 | o-methylbenzoyl chloride | 34 | 281 |
| n-propyl | chloride | 0.02 | o-methylbenzoyl chloride | 200 | 289 |
| isopropyl | — | — | — | 68 | 266 |
| isopropyl | naphthenate | — | — | 90 | 272 |
| isopropyl | — | 0.05 | trialkylbenzyl ammonium chloride | 110 | 277 |
| isopropyl | naphthenate | 0.05 | trialkylbenzyl ammonium chloride | >360 | 272 |

Comparable tests were made with a polyester resin in which solely the n-butylether of benzoin had been dissolved, and with a polyester resin containing in addition to this ether also magnanese naphthenate or trialkylbenzyl ammonium chloride. The compositions used and the results obtained are tabulated hereafter (Table 2).

EXAMPLE III

A solution of iron naphthenate in the trialkylbenzyl ammonium chloride described in Example I was dissolved in 100 parts by weight of the unsaturated polyester resin hereinbefore described, so that the polyester resin contained 0.0004 parts by weight of iron and 0.05 parts by weight of trialkylbenzyl ammonium chloride. Subsequently, 2 parts by weight of n-butylether of benzoin were dissolved in the polyester resin and 150 parts by weight of calcium carbonate were mixed in. The stability in the dark at 100°C. and the residual styrene-content after lighting for 2 minutes of the composition thus obtained were determined.

with compositions containing other chlorine compounds applicable according to the invention. The compositions used and the resins obtained are tabulated hereafter (Table 3).

TABLE 2

| 2% of benzoin ether | 0.0004% of manganese as | % | chloro compound | stability in minutes | Persoz hardness |
|---|---|---|---|---|---|
| n-butyl | — | — | — | 33 | 260 |
| n-butyl | naphthenate | — | — | 35 | 255 |
| n-butyl | — | 0.05 | trialkylbenzyl ammonium chloride | 55 | 266 |
| n-butyl | naphthenate | 0.05 | trialkylbenzyl ammonium chloride | 90 | 270 |

TABLE 3

| 2% of benzoin-n-butyl ether | 0.0004% of iron as chloride | 150% of Ca-carbonate | 0.05% of chloro compound | stability in minutes | residual styrene content after lighting for 2 minutes |
|---|---|---|---|---|---|
| + | − | + | — | 24 | 0.24 |
| + | + | + | — | 26 | 0.22 |
| + | − | + | trialkylbenzyl ammonium chloride | 34 | 0.20 |
| + | + | + | trialkylbenzyl ammonium chloride | 47 | 0.23 |
| + | − | + | phenyltrimethyl ammonium chloride | 35 | 0.19 |
| + | + | + | phenyltrimethyl ammonium chloride | 49 | 0.19 |
| + | − | + | stearyldimethylbenzyl ammonium chloride | 31 | 0.24 |
| + | + | + | stearyldimethylbenzyl ammonium chloride | 44 | 0.21 |
| + | − | + | [1]alkylmethylisoquinoliniumchloride | 27 | 0.22 |
| + | + | + | [1]alkylmethylisoquinoliniumchloride | 41 | 0.18 |
| + | − | + | [2]dialkyldimethyl ammonium chloride | 27 | 0.22 |
| + | + | + | [2]dialkyldimethyl ammonium chloride | 43 | 0.21 |

[1]mixture of 25% of dodecylmethylisoquinolinium chloride
55% of tetradecylmethylisoquinolinium chloride
17% of hexadecylmethylisoquinolinium chloride
3% of octodecylmethylisoquinolinium chloride

[2]mixture of 2% of di-tetradecyldimethyl ammonium chloride
38% of di-hexadecyldimethyl ammonium chloride
60% of di-octodecyldimethyl ammonium chloride Comparable tests were made with a composition containing n-butylether of benzoin and calcium carbonate, with a composition containing in addition iron chloride and with a composition which contained in addition to n-butylether of benzoin, trialkylbenzyl ammonium chloride. Analogous and comparable tests were made

EXAMPLE IV

In an analogous way to that described in Example III, comparable tests were made with other compositions, as described in Tables 4 and 5. The results obtained with these compositions have also been mentioned in these tables.

TABLE 4

| 2% of benzoin-n-butyl ether | 0.0004% of manganese as naphthenate | % | filler | 0.05% of alkyldimethyl-benzyl ammonium chloride[3] | stability in minutes | residual styrene content after lighting for 2 minutes |
|---|---|---|---|---|---|---|
| + | + | 150 | Ca-carbonate | − | 27 | 0.23 |
| + | + | 150 | Ca-carbonate | + | 43 | 0.20 |
| + | + | 50 | Al-silicate | − | 16 | 0.21 |
| + | + | 50 | Al-silicate | + | 44 | 0.20 |

[3]mixture of 5% of dodecyldimethylbenzyl ammonium chloride
60% of tetradecyldimethylbenzyl ammonium chloride
30% of hexadecyldimethylbenzyl ammonium chloride
5% of octodecyldimethylbenzyl ammonium chloride

TABLE 5

| 2% of benzoin ether | 0.0004% of iron as chloride | % | filler | % | chloro compound | stability in minutes | residual styrene content after lighting for 2 minutes |
|---|---|---|---|---|---|---|---|
| isopropyl | − | 150 | Ca-carbonate | — | — | 36 | 0.18 |
| isopropyl | + | 150 | Ca-carbonate | — | — | 39 | 0.17 |
| isopropyl | − | 150 | Ca-carbonate | 0.05 | dialkyldimethylammonium chloride[2] | 46 | 0.20 |
| isopropyl | + | 150 | Ca-carbonate | 0.05 | dialkyldimethylammonium chloride[2] | 61 | 0.19 |

TABLE 5

| 2% of benzoin ether | 0.0004% of iron as chloride | % | filler | % | chloro compound | stability in minutes | residual styrene content after lighting for 2 minutes |
|---|---|---|---|---|---|---|---|
| n-butyl | − | 50 | Al-silicate | — | — | 12 | 0.20 |
| n-butyl | + | 50 | Al-silicate | — | — | 18 | 0.18 |
| n-butyl | − | 50 | Al-silicate | 0.05 | alkyldimethylbenzylamm. chloride[3] | 27 | 0.18 |
| n-butyl | + | 50 | Al-silicate | 0.05 | alkyldimethylbenzylamm. chloride[3] | 46 | 0.19 |
| n-butyl | − | 50 | Al-silicate | 0.05 | phenyltrimethylammonium chloride | 26 | 0.20 |
| n-butyl | + | 50 | Al-silicate | 0.05 | phenyltrimethylammonium chloride | 48 | 0.18 |

[2]mixture of   2% of di-tetradecyldimethylammonium chloride
38% of di-hexadecyldimethylammonium chloride
60% of di-octodecyldimethylammonium chloride

[3]mixture of   5% of dodecyldimethylbenzylammonium chloride
60% of tetradecyldimethylbenzylammonium chloride
30% of hexadecyldimethylbenzylammonium chloride
5% of octodecyldimethylbenzylammonium chloride

| | | | | | | | |
|---|---|---|---|---|---|---|---|
| n-butyl | − | 50 | Al-silicate | 0.05 | stearyldimethylbenzylamm. chloride | 25 | 0.20 |
| n-butyl | + | 50 | Al-silicate | 0.05 | stearyldimethylbenzylamm. chloride | 43 | 0.20 |
| n-butyl | − | 50 | Al-silicate | 0.05 | alkylmethylisoquinolinium chloride[1] | 25 | 0.21 |
| n-butyl | + | 50 | Al-silicate | 0.05 | alkylmethylisoquinolinium chloride[1] | 43 | 0.18 |
| n-butyl | − | 50 | Al-silicate | 0.05 | dialkyldimethylammonium chloride[2] | 28 | 0.22 |
| n-butyl | + | 50 | Al-silicate | 0.05 | dialkyldimethylammonium chloride[2] | 46 | 0.19 |
| isopropyl | − | 50 | Al-silicate | — | — | 43 | 0.17 |
| isopropyl | + | 50 | Al-silicate | — | — | 45 | 0.15 |
| isopropyl | − | 50 | Al-silicate | 0.05 | dialkyldimethylammonium chloride[2] | 54 | 0.19 |
| isopropyl | + | 50 | Al-silicate | 0.05 | dialkyldimethylammonium chloride[2] | 82 | 0.17 |

[1]mixture of   25% of dodecylmethylisoquinolinium chloride
55% of tetradecylmethylisoquinolinium chloride
17% of hexadecylmethylisoquinolinium chloride
3% of octodecylmethylisoquinolinium chloride

[2]mixture of   2% of di-tetradecyldimethylammonium chloride
38% of di-hexadecyldimethylammonium chloride
60% of di-octodecyldimethylammonium chloride

What is claimed is:

1. A process for preparing a stabilized, U.V. light curable composition comprising forming a mixture containing 0.1–5 percent by weight of a benzoin ether of a primary or secondary alcohol, as a stabilizer 0.00002–0.001 percent by weight of a soluble iron and-/or manganese compound and 0.001–0.1 percent by weight of at least one organic chloro compound selected from the group consisting of (a) quaternary ammonium chlorides, (b) amine hydrochlorides and (c) compounds capable of forming chlorine ions in situ and the remainder an unsaturated polyester resin, said percentages by weight being calculated on the polyester resin.

2. The process according to claim 1, in which the benzoin ether of a primary or secondary alcohol is incorporated in the composition in an amount of 1 – 2 percent by weight calculated on the polyester resin.

3. The process according to claim 1, in which the iron or manganese compound is incorporated in the composition in an amount of 0.0002 – 0.0004 percent by weight calculated on the polyester resin.

4. The process according to claim 3, wherein the iron and/or manganese is incorporated in the composition as a chloride, naphthenate, octoate or acetylacetonate.

5. The process according to claim 1, in which the organic chloro compound is a quaternary ammonium compound.

6. The process according to claim 1, in which the organic compound capable of forming chlorine ions in situ is a compound having the general formula:

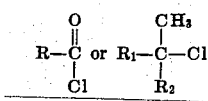

wherein R represents an alkyl group, $C_5$ –$C_{20}$, or a substituted or non-substituted aryl group, $C_6$ –$C_{12}$, $R_1$ represents a substituted or non-substituted aryl group, $C_6$ –$C_{12}$, and $R_2$ represents a hydrogen atom or an alkyl group of $C_1$ –$C_4$.

7. The process according to claim 1, in which in addition a filler is incorporated in the composition in an amount of 5 – 500 percent by weight calculated on the polyester resin.

8. The process according to claim 7, in which the amount of filler is 25 – 250 percent by weight.

9. A composition curable by U.V. light comprising 0.1–5 percent by weight of a benzoin ether of a primary or secondary alcohol, as a stabilizer 0.00002–0.001 percent by weight of a soluble iron and/or manganese compound and 0.001–0.1 percent by weight of at least one organic chloro compound selected from the group consisting of (a) quarternary ammonium chlorides, (b) amine hydrochlorides and (c) compounds capable of forming chlorine ions in situ and the remainder an unsaturated polyester resin, said percentages by weight being calculated on the polyester resin.

10. The composition as claimed in claim 9, in which the iron or manganese compound is a chloride, naphthenate, octoate or acetyl acetonate.

11. The composition as claimed in claim 9, which includes a quaternary ammonium compound.

12. The composition as claimed in claim 9, which includes a compound having the general formula:

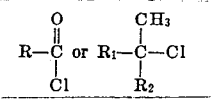

wherein R represents an alkyl group, $C_5$–$C_{20}$, or a substituted or non-substituted aryl group, $C_6$–$C_{12}$, $R_1$ represents a substituted or non-substituted aryl group, $C_6$–$C_{12}$, and $R_2$ represents a hydrogen atom or an alkyl group, $C_1$–$C_4$.

13. The composition of claim 9, which includes in addition a filler in an amount of 5 – 500 percent by weight calculated on the polyester resin.

14. The process for curing an unsaturated polyester resin comprising irradiating with U.V. light a composition as claimed in claim 9.

* * * * *